Oct. 31, 1944.  W. D. BELL  2,361,366
APPARATUS FOR SEALING CONTAINERS
Filed Sept. 2, 1942  7 Sheets-Sheet 1

INVENTOR
William D. Bell.
BY Corbett, Mahoney & Miller
ATTORNEYS

Oct. 31, 1944.  W. D. BELL  2,361,366
APPARATUS FOR SEALING CONTAINERS
Filed Sept. 2, 1942  7 Sheets-Sheet 5

INVENTOR
William D. Bell.
ATTORNEYS

Oct. 31, 1944.   W. D. BELL   2,361,366
APPARATUS FOR SEALING CONTAINERS
Filed Sept. 2, 1942   7 Sheets-Sheet 6

INVENTOR
William D. Bell.
BY Corbett, Mahoney & Miller
ATTORNEYS

Oct. 31, 1944.  W. D. BELL  2,361,366
APPARATUS FOR SEALING CONTAINERS
Filed Sept. 2, 1942 7 Sheets-Sheet 7

INVENTOR
William D. Bell.
BY Corbett, Mahoney & Miller
ATTORNEYS

Patented Oct. 31, 1944

2,361,366

UNITED STATES PATENT OFFICE 2,361,366

APPARATUS FOR SEALING CONTAINERS

William D. Bell, Columbus, Ohio, assignor to Anchor Hocking Glass Corporation, Lancaster, Ohio, a corporation of Delaware Application September 2, 1942, Serial No. 457,035

24 Claims. (Cl. 226—82)

My invention relates to an apparatus for sealing containers. It has to do, more particularly, with an apparatus for producing a partial vacuum within sealed containers.

It is the custom in the prior art to produce a partial vacuum in containers for food and similar products to prevent spoilage, by performing the sealing operation in an atmosphere of condensible vapor. Sealing in an atmosphere of steam, condensible vapor, is the oldest and most elementary of all canning operations, being as old as the art of canning food for future use. It is the method used by the housewife in the kitchen, where the heated material being canned provides its own atmosphere by vaporization.

On a commercial basis a partial vacuum is often produced in the sealed containers by passing the filled containers through a tunnel or chamber in which an atmosphere of live steam is maintained, and applying closures to the containers and sealing them on the containers while in this tunnel. Certain factors make this method somewhat less effective in practice than in theory. For example, containers entering the tunnel carry with them a considerable volume of atmospheric air, which contaminates the atmosphere within the tunnel, and containers emerging from the tunnel carry steam out with them, resulting in a lower vacuum in the containers sealed therein. It is the custom to move the containers continuously through the tunnel and this carrying of air into the entrance end of the tunnel and steam out of the exit end thereof is more pronounced as the speed of movement is increased. This can be avoided to a certain extent by an increased volume of steam admitted to the tunnel but the increased volume of steam results in waste of steam and the addition of an undesirable quantity of moisture to the contents of the containers.

One of the objects of my invention is to provide an apparatus for applying a cap to a container and to create a partial vacuum in the upper end of the container wherein the cap is initially sealed on the container by atmospheric pressure.

Another object of my invention is to provide an apparatus of the type indicated for bringing about an extremely rapid drop in pressure in the head space of a container beneath a cap guided into position relative thereto which will cause seating of the cap in sealing contact with the upper end of the container.

Another object of my invention is to provide a more positive means for expelling air from the head space of a container, without the use of an excessive amount of steam.

Another object of my invention is to provide a more compact apparatus for vacuumizing and sealing containers.

Another object of my invention is to provide a continuous apparatus for sealing caps on the containers in the manner indicated in the preceding paragraphs.

Another object of my invention is to provide a continuous straight-line machine wherein the containers and caps may be continuously and progressively fed at high speed into association with each other, live steam will be introduced into the head space of each container as the cap is guided into association therewith and will quickly condense to hold the cap down in sealing contact with the container, the sealed container then being moved to a suitable station.

Another object of my invention is to provide a continuous machine of the type indicated in the preceding paragraph which is of simple and inexpensive construction but which will have a very high sealing capacity, will seal the containers effectively, and will seal the containers economically.

Another object of my invention is to provide a machine of the type indicated having novel means associated therewith for guiding the caps into proper position to be applied to the containers and for preventing them from being applied in tilted position.

Another object of my invention is to provide a machine of the type indicaed having novel means for guiding the containers into sealing position and for supporting them during the sealing operation.

In general, it is the usual practice to move the containers, during the entire process of filling and sealing, on constantly moving endless conveyers on which the containers may be placed more or less at random. It is the purpose of this invention to provide suitable apparatus for applying closures to the filled containers as they are moved along by such a conveyer, but without moving them through a steam tunnel or chamber, the closure-applying or cap-feeding mechanism including in its construction means for injecting live steam beneath the closure member as it is guided into association with the container so that it will enter the head space of the container. This steam will quickly condense after the closure member is seated on the container so that the desired partial vacuum will be quickly produced within the head space of the container and will pull the closure member down on its seat on the container and hold it there. The invention also includes novel means for supporting the containers during their progress through the cap-feeding mechanism.

More specifically, I preferably employ a straight-line machine. This machine preferably embodies a straight-line continuously moving conveyer upon which the filled containers may be placed at random. Disposed above the conveyer in spaced relationship is a cap-feeding and guiding means which is adapted to guide caps into association with the upper ends of the containers as they move past the sealing station. At the sealing station, one of the caps is supported in such a position that it will be withdrawn from its support by a container moving into sealing position. Before each successive container reaches the sealing station, it is engaged by novel gripping and guiding means. This means serves to guide the container into proper position at the sealing station and to prevent tilting of the container during the sealing operation. At the sealing station, I provide means for guiding caps into proper position to be applied to the containers and means for preventing them from being applied in tilted position to the containers.

I also provide at the sealing position, means for supplying a charge of live steam in association with the cap being withdrawn from the cap-feeding means. This means functions as each container moves into sealing position and engages the cap which is supported in downwardly inclined position by the cap-feeding and guiding means so that the upper end of the container will engage the skirt of the cap. A charge of live steam is supplied automatically when the cap is withdrawn from the supporting means by the container. The steam is in the form of a jet and is first charged into the angular space between the cap and container. This jet of steam first impinges upon the inner or lower surface of the cap, and by condensation deposits a film of moisture upon this relatively cold surface of the interior of the cap, the outer surface of the cap being in contact with air only. As the forward movement of the container and cap withdraws the cap from the cap-supporting means, the rear edge of the cap, being no longer supported by the cap feed, drops down to a relatively level position upon the finish of the container. During this brief interval, the jet of live steam comes into contact with the outer or upper surface of the cap and raises its temperature sufficiently to vaporize the film of water upon its inner surface. This results in an expansion of the vapor within the head space at the instant of sealing, resulting in a more complete displacement of air and a higher evacuation. As the cap is seated, the jet of steam is cut off and the pressure within the head space will drop so rapidly, that atmospheric pressure will press the cap on its seat and will be sufficient to initially seal the cap upon the container. This action is possible because the temperature of the steam entrapped below the cap is so high and the specific gravity so low that cooling, with a corresponding drop in pressure, is so rapid that the cap will be drawn down into firm sealing relationship with the upper end of the container.

After the cap is applied to the container and is initially sealed thereon in the manner indicated above, the containers may be moved to a station where mechanical means is used to effect permanent sealing of the containers. Whether or not the mechanical means is used for effecting permanent sealing will depend upon the type of closure being used to seal the container. With some caps, mechanical pressure will be desirable to effect the final sealing but this mechanical sealing may occur a considerable period of time after the initial sealing has been effected. With some caps, such as a top seal cap, the final sealing with mechanical pressure will not be necessary.

In order to aid in understanding my apparatus for applying the closures and of producing the partial vacuum, an embodiment of the invention is illustrated in the accompanying drawings. However, it is to be understood that there is no intention to limit the invention to this detailed embodiment.

In these drawings similar characters of reference designate corresponding parts and:

Figures 1, 2:
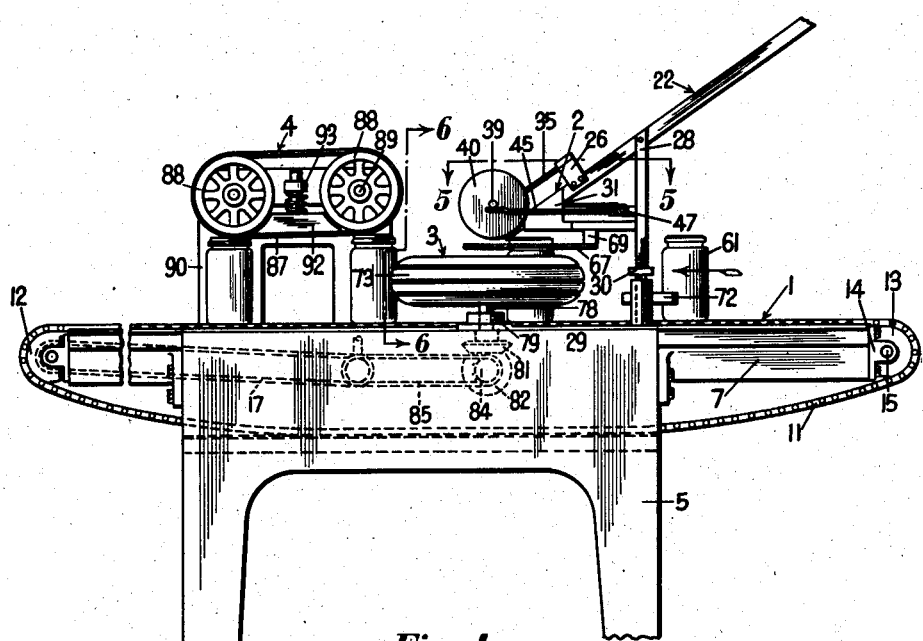
Figure 1 is a side elevational view of a machine which I preferably provide for applying closures and producing a partial vacuum in containers.
Figure 2 is a top plan view of the machine shown in Figure 1.

With reference to the drawings, and particularly to Figures 1 and 2, I have illustrated one form of my apparatus as comprising generally a supporting table and conveyer unit 1, a vacuumizing and sealing unit 2, a container gripping and guiding unit 3 and a mechanical pressure sealing unit 4. The unit 1 will feed the containers continuously into association with the unit 2 where a cap will be guided into association with the upper end of the container, and steam will be charged beneath and on the cap as the cap is seated on the container. While the container is associated with unit 2, it will be gripped by the unit 3. The unit 4 will serve to apply mechanical sealing pressure to the cap and may or may not be used, depending upon the type of cap employed.

Figure 6:
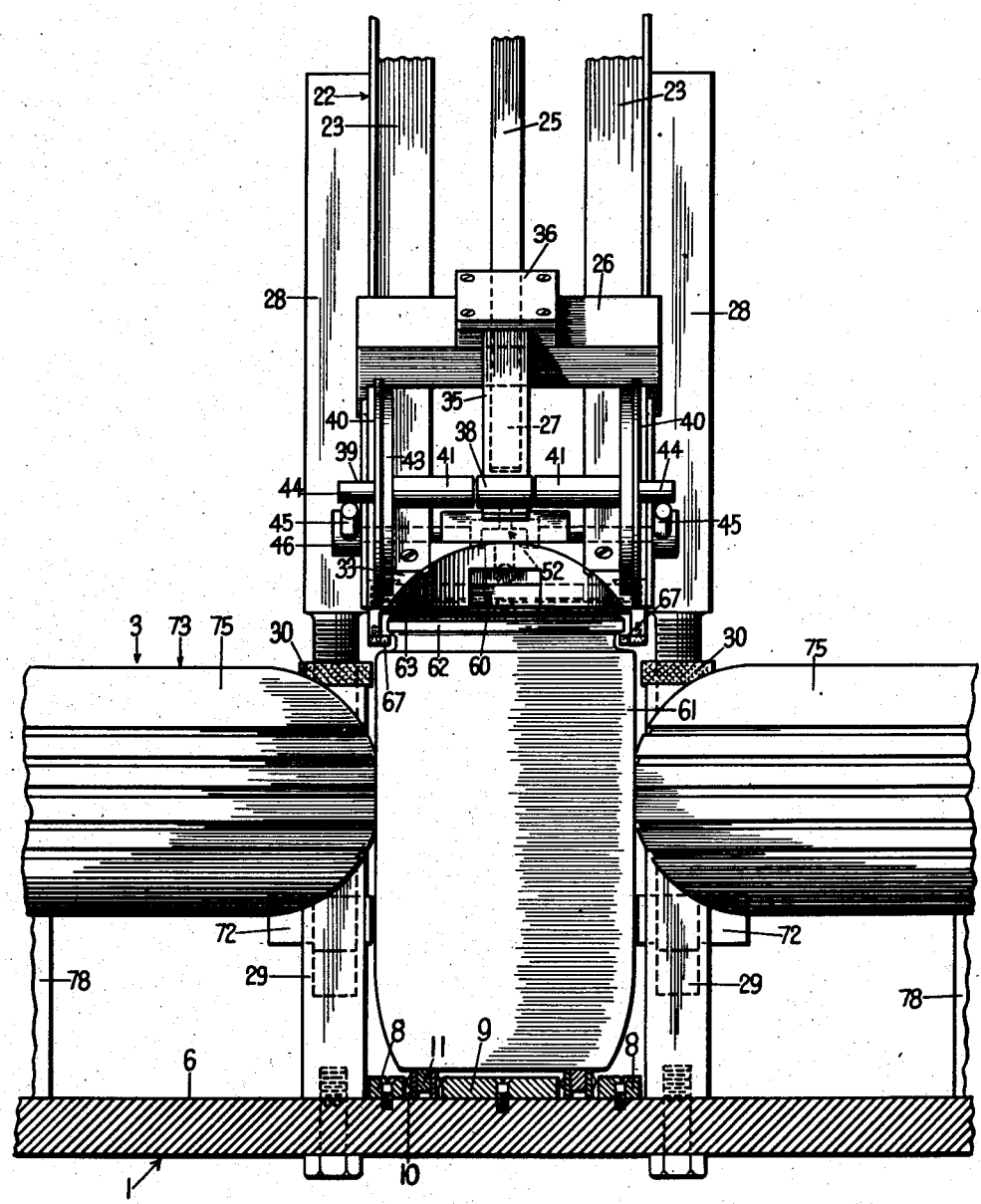
Figure 6 is a transverse vertical sectional view taken substantially along line 6—6 of Figure 1.
Figure 7:
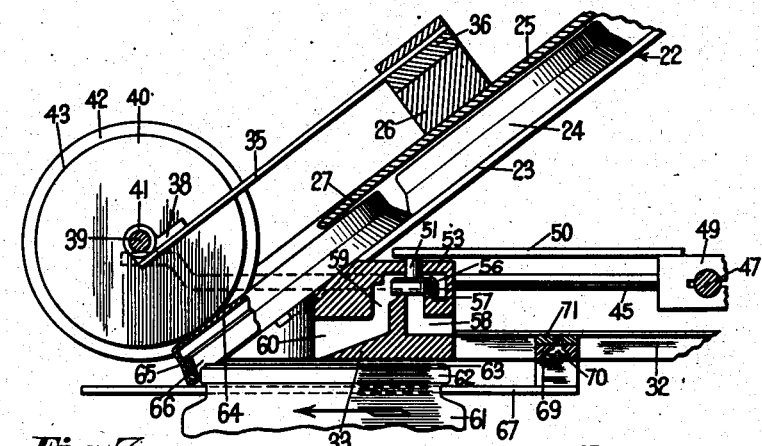
Figure 7 is an enlarged vertical sectional view illustrating the container moving into position to withdraw a cap from its support.

The unit 1 is in the form of a table having four legs 5 which support a top plate 6. Longitudinally extending beams 7 are bolted to the table intermediate its side edges and project from each end thereof. As shown best in Figures 2, 3 and 6, a pair of longitudinally extending spaced strips 8 are secured to the top plate 6 and these strips extend over the top surfaces of members 7. Intermediate the strips 8 a third longitudinally extending strip 9 is provided which is secured to the top plate 6 and beams 7. These three strips serve to provide longitudinally extending channels 10 (Figure 3) on top of the plate 6 and beams 7 which receive a pair of chains 11. The chains 11 are of the sprocket type and extend longitudinally through the channels 10. The chains slide on the top surfaces of plate 6 and beams 7 and project slightly above the bars 8 and 9 so that they will support the bottom of a container, in the manner shown in Figure 6, out of contact with the bars.

The chains 11 are endless chains and pass around double sprocket units 12 and 13 disposed at opposite ends of the table. The sprocket units 12 and 13 are rotatably supported by brackets 14 disposed at opposite ends of the table and being bolted thereto, as shown in Figure 1. These brackets rotatably receive shafts 15 which support the sprockets. The shaft 15 which supports the sprocket 12 is extended from bracket 14 and carries a sprocket 16 which is keyed thereon. It will be apparent that rotation of the sprocket 16 will drive the conveyer chains 11.

The sprocket 16 is driven by means of an endless sprocket chain 17. The chain 17 is driven by a sprocket 18 which is keyed on the transversely disposed horizontal shaft 19 that is rotatably carried beneath the plates. The sprocket 18 is disposed intermediate the length of the shaft 19. One end of the shaft 19 extends into a gear unit 20 which drives it and which, in turn, is driven by an electric motor 21. The units 20 and 21 are supported by the lower surface of plate 6. Thus, whenever the motor 21 is energized, the chain conveyer will be driven continuously.

The unit 2 is disposed at a level spaced vertically above the chain conveyer depending upon the height of the container being sealed. The unit 2 is disposed in alignment with the conveyer substantially midway between the side edges of the table. Furthermore, it is disposed intermediate the length of the conveyer and table. Containers placed at random on the chain conveyer behind the unit 2 will be moved progressively, by the continuously moving conveyer, into association with the unit 2.

The unit 2 includes a downwardly and forwardly inclined cap chute 22. This chute 22 (Figures 3, 4 and 5) comprises a pair of spaced guide rails 23 which are in the form of angle members. These rails 23 are properly positioned to support caps 24 which are disposed in edge-to-edge relationship. A bar 25 disposed intermediate guide rails 23 and above the rails serves to prevent the caps from riding up on each other as they slide down the chute. The lower end of the bar 25 is supported by a bracket 26 which is secured to the rails 23. The lower end of the bar 25 is turned downwardly slightly, as at 27, (Figure 4).

The rails 23 are secured to the upper ends of vertical supports 28. These supports have threaded lower ends mounted for vertical movement in socket members 29 carried by the top plate 6 of the table on opposite sides of the chain conveyer.

Collars 30 are threaded on the threaded portions of members 28 for moving these members in and out of their sockets 29. The extreme lower ends of the guide rails 23 are rigidly secured to a pair of forwardly projecting brackets 31 (Figure 3) which are secured to angle member supports 32. The supports 32 extend horizontally rearwardly to the vertical supports 28 to which they are secured. A transversely extending block 33 is secured to the horizontal supports 32. The block 33 is provided with a downwardly inclined forward upper edge portion 34. The inclination of this edge is the same as that of rails 23 and the edge is disposed flush with the lateral surfaces of the rails. The block 33 is made in two sections secured together by screw 33a (Figure 4).

Figure 3:
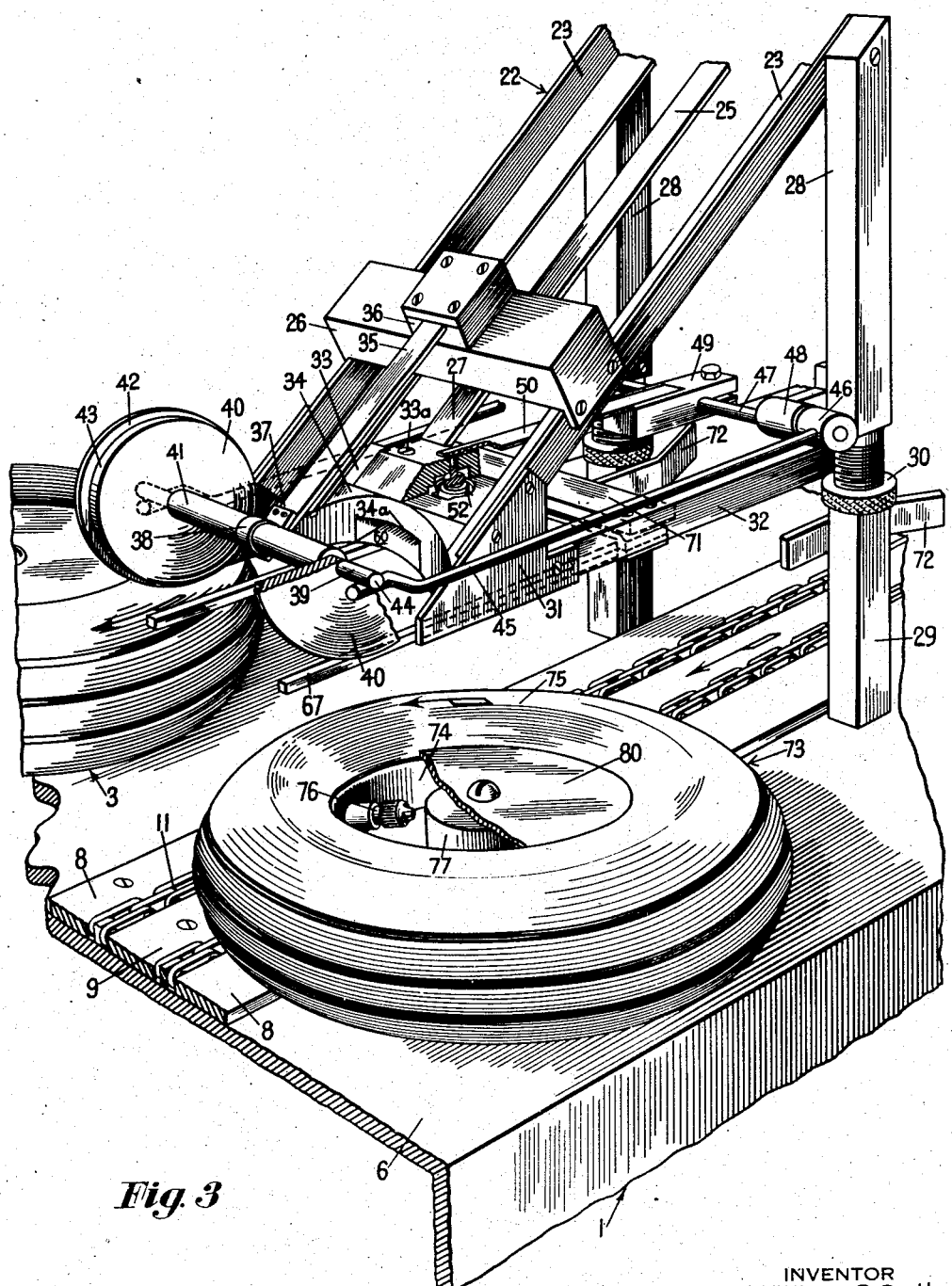
Figure 3 is a perspective view, partly broken away, of the sealing unit and associated mechanism of the machine shown in Figures 1 and 2.
Figure 4:
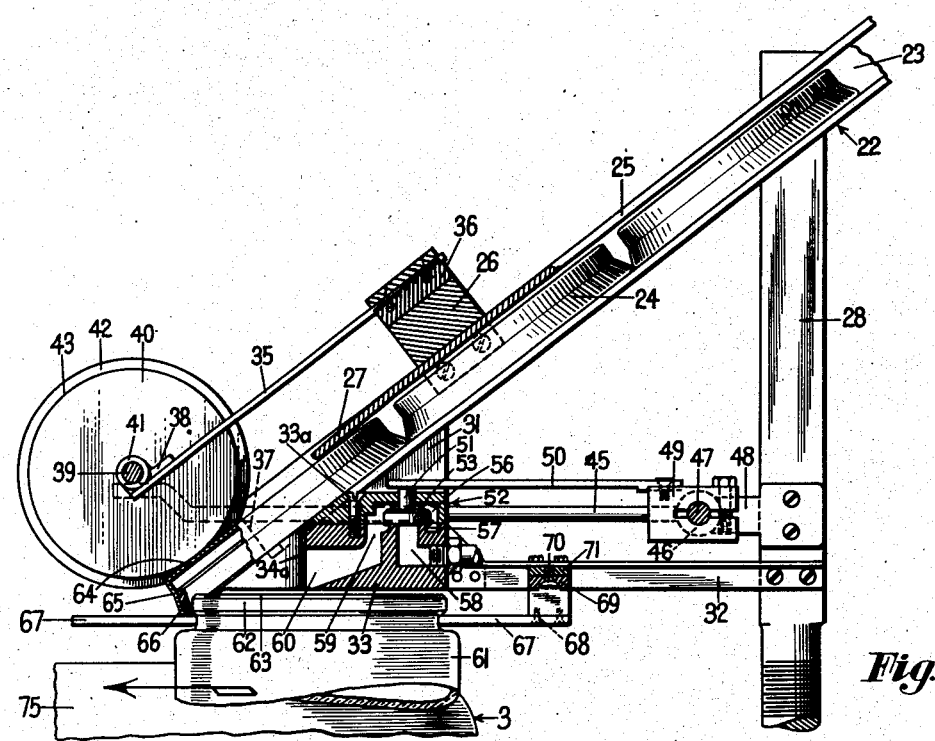
Figure 4 is a longitudinal vertical sectional view taken substantially along line 4—4 of Figure 2.
Figure 5:
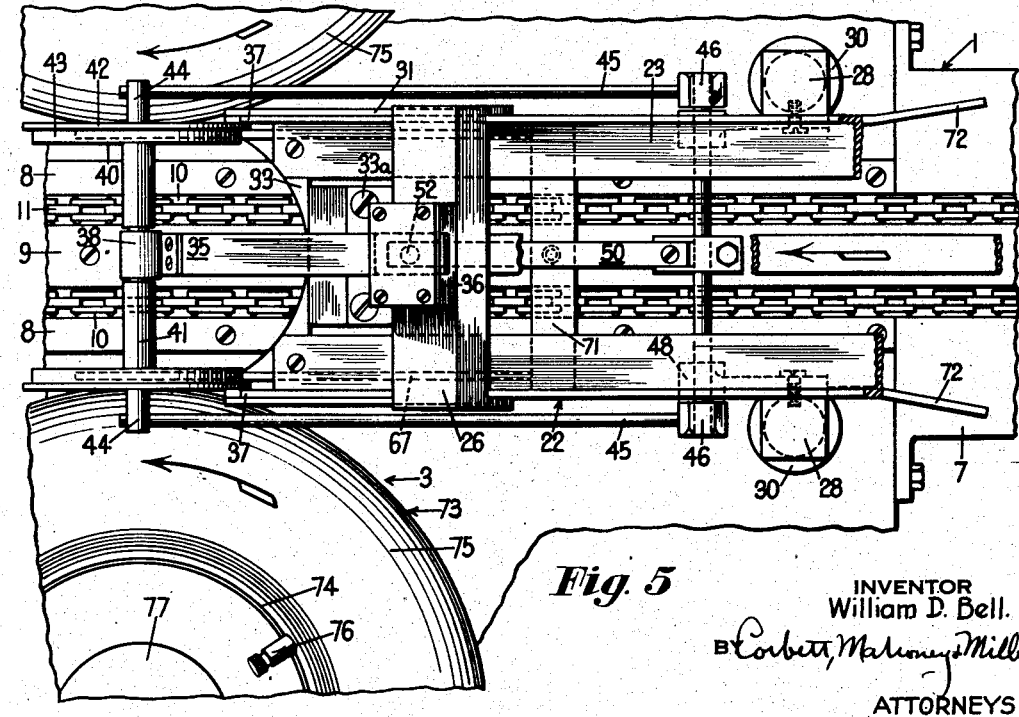
Figure 5 is a horizontal sectional view taken substantially along line 5—5 of Figure 1.

As shown best in Figures 3, 4 and 5, the bracket 26 carries a downwardly and forwardly extending flat spring 35 which is supported midway between and above rail members 23. This spring 35 is attached at its upper end to a block 36 secured to bracket 26 which cooperate to space the spring member 35 the proper distance from rails 23. The spring 35 normally extends downwardly at the same inclination as the rails 23. It extends a considerable distance beyond the lower ends 37 of the rails. The extreme lower end of spring 35 has a bearing collar 38 secured thereto in which a shaft 39 is mounted for rotatable and slidable movement. A pair of rollers 40 are keyed to the shaft 39 adjacent its outer ends. Spacer sleeves 41 are provided on shaft 39 between rollers 40 and member 38 to limit longitudinal movement of the shaft. The sleeves 41 are of a proper length to permit limited axial movement of the shaft 39 in bearing 38. Each of the rollers 40 is provided with a circumferential flange 42 at its outer side. The flanges 42 are spaced apart a distance corresponding to the diameter of the cap 24. Thus, flanges 42 of the rollers will engage the side edges of the cap while the circumferences 43 of the main part of the rollers will engage the top surfaces of the caps adjacent their edges. It will be apparent that the rollers 40 are free to rotate and are also free to move laterally to a limited extent. Also, since the rollers are supported by spring 35, they are flexibly mounted and can be moved bodily vertically.

The roller-supporting shaft 39 extends outwardly a considerable distance beyond rollers 40 at each end (Figures 3 and 5). These extensions 44 rest on the forward ends of a pair of rods 45. These rods 45 extend rearwardly horizontally to a point adjacent the vertical supports 28. The rear ends of rods 45 are secured to collar members 46 which are keyed on the outer ends of a transverse horizontally disposed shaft 47. The shaft 47 is mounted for rotation in bearing members 48 secured to members 28. Midway between its ends the shaft 47 has a forwardly extending clamp member 49 clamped in substantially horizontal position thereon. This member 49 has the rear end of a flat spring 50 secured to the forward end thereof. This spring 50 projects horizontally forwardly over the block member 33.

The forward end of spring 50 engages the upper end of a projecting plunger 51 mounted for vertical movement in an opening formed midway between the ends of block 33. This plunger 51 is part of a steam supply control valve, indicated generally by numeral 52, which is mounted in the block 33. This valve (Figures 3 and 4) includes a disk-like portion 53, formed on the lower end of plunger 51, which is disposed for vertical movement in a chamber 56 formed within block 33. This chamber 56 is provided with an annular valve seat 57 upon which the member 53 is normally held seated by means of spring 50 and plunger 51.

The spring 35 is normally in such position that the rollers 40 and shaft 39 will be in their lowermost positions. At this time, the extensions 44 of shaft 39 will press downwardly on the forward ends of rods 45. This will swing the forward end of spring 50 downwardly about the axis of shaft 47 and will press plunger 51 downwardly, seating member 53 on the seat 57. The rollers 40, as previously indicated, are flexibly mounted and when they are moved upwardly, there will be no pressure on the forward ends of rods 45. Consequently, spring 50 will not be held downwardly, with any appreciable force, in contact with the upper end of plunger 51. This will permit steam pressure within inlet passageway 58, below seat 57, to lift member 53 from the seat 57. This will allow steam to enter into chamber 56. The passage 58 will be connected to a suitable source of dry steam. An outlet passageway 59 leads from the chamber 56 and has a forwardly directed discharge nozzle portion 60 formed in the forward vertical edge 34a of the lower portion of block 33. This discharge nozzle flares outwardly in all directions to form a wide mouth as shown best in Figure 3. The forward edge 34a of the lower section of the block 33 is curved, as indicated best in Figure 3, to substantially the same curvature as the caps to be used.

The caps which I use for sealing the containers may be of various types. In Figures 4 and 7 to 9, inclusive, I have illustrated side seal caps being used. These side seal caps are commonly used for sealing glass jars of the type shown in the drawings and indicated by the numeral 61. This glass jar is provided with a reduced mouth having a vertical sealing surface 62 and a tapered finish 63. The cap 24 is shown as comprising a disk-like body portion 64 having a depending peripheral skirt 65. This skirt carries on its interior a compressible gasket 66. When the cap 24 is forced down into telescoping relationship with the upper end of the container 61, the gasket 66 will contact with the vertical surface 62, forming a tight frictional seal. However, it is to be understood that my invention is not limited to the particular type of container or cap shown in the drawings.

The caps fed into the chute 22 will be in edge-to-edge relationship, as previously stated. The lowermost cap will slide down to the position shown in Figure 7 until it engages the rollers 40. The lowermost cap will move downwardly until its lower edge moves between the flanges 42 of the rollers 40 and the surfaces 43 of the rollers engage the top surface of the cap. Then downward movement of the lowermost cap will be stopped. At this time, the extensions 44 of shaft 39 will be resting on the outer ends of rods 45 and, consequently, valve 52 will be held closed and there will be no steam issuing from nozzle portion 60. The lowermost cap is held in the chute by the rollers and is prevented from tilting by portion 27 of member 25. Consequently, the lowermost cap will be held in the position shown in Figure 7, depending from the cap chute and being in such an inclined position that the forward portion of the flange 65 will be engaged by the upper end of the container 61 being moved into sealing position by the chain conveyer.

Figure 8:
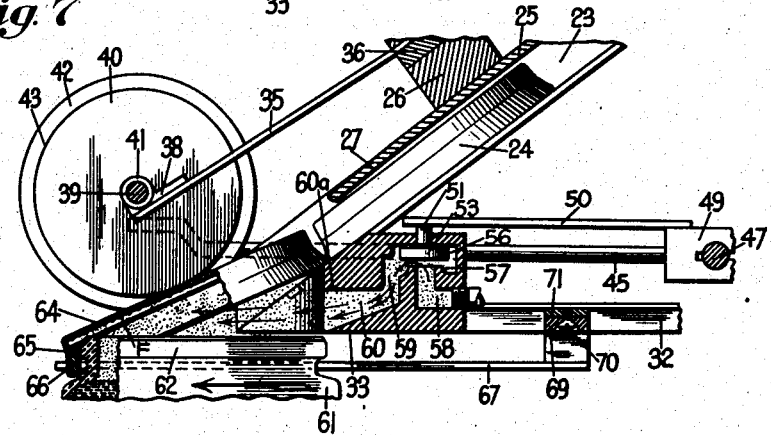
Figure 8 is a view similar to Figure 7 but showing the cap being withdrawn by the container and actuating the valve for charging the steam beneath the cap.

As the continuously moving chain conveyer moves the container 61 beneath unit 2, the upper end of the container engages the skirt of the cap and withdraws it from the chute. As the cap is withdrawn from the chute, the cap pivots about the rear edges of the rollers. The rollers 40 will be raised during this action, as shown in Figure 8. The rollers 40 will also move laterally, if necessary, to permit lateral alignment of the cap and container. As the container continues to move, the cap will be guided into cooperative position with the upper end thereof and will be positioned thereon. The successive steps of this operation are illustrated best in Figures 7, 8 and 9. When rollers 40 are lifted by the cap, no force will be applied to the outer ends of rods 45 and, therefore, steam supply valve 52 may open, as will be described in detail hereinafter.

Figure 9:
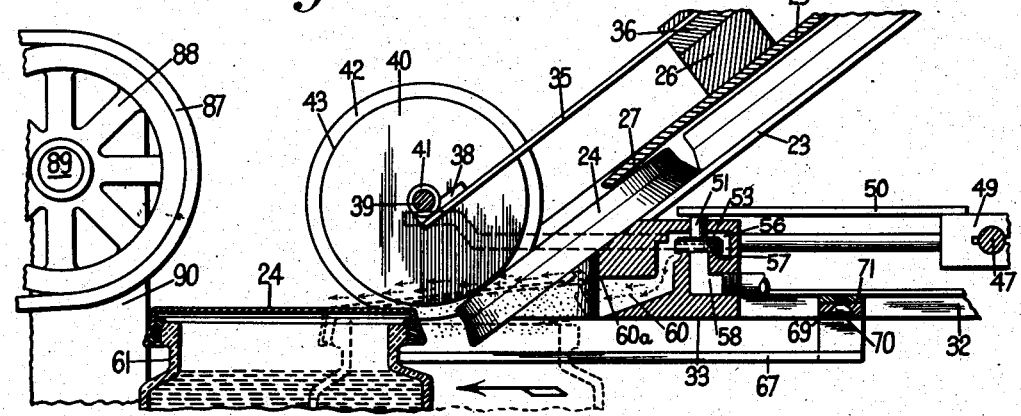
Figure 9 is a view similar to Figure 8 but showing by full lines the cap in its initially sealed position on the container and by dotted lines the cap in the position it occupies just before it seats on the container.

In order to insure the proper seating of the cap upon the finish of the container, I provide a pair of guide rails 67. These rails are so positioned that they provide a fulcrum about which the cap rotates to an approximately level position as it is seated upon the container. These guide rails 67 (Figures 3 to 9) extend longitudinally in spaced relationship and have their rear ends rigidly connected, as at 68, to a yoke 69. This yoke 69 is supported on the supports 32 behind block 33 by means of a screw 70 passing through an opening formed in yoke 69 midway between its ends. This screw is threaded into a bar 71 secured to supports 32 transversely thereof. As shown in Figures 4 and 7 to 9, the head of the screw 70 fits into the opening in such a manner that limited universal movement of the yoke 69 relative to the bar 71 will be permitted. The guide rails 67 are spaced apart laterally a distance slightly greater than the diameter of the reduced upper portion of the containers. Thus, the upper ends of the containers may move freely therebetween and they will align with the containers. However, the spacing between rails 67 is such that the skirt of the cap will be engaged, at diametrically opposed points, when the cap moves downwardly to a predetermined position, as shown in Figure 8. As the cap is removed from the chute, its rear edge moves off the block 33 and the guide rails 67 exert a leveling action on the cap, and will prevent the cap from being applied in tilted position on the container. The guide rails 67 are at such a level, as shown in Figure 9, that when the gasket 66 of the cap is in contact with the vertical surface 62 of the container, the skirt of the cap will not be in contact with the rails 67.

Thus, the rails 67 will cooperate with the rollers 40 to level the cap relative to the upper end of the container as it is withdrawn from the chute. However, the rails 67 will not interfere with the cap being brought down into sealing contact with the upper end of the container. The rails 67 may swing laterally or move vertically to a limit extent. Thus, they will cooperate with the rollers 40 in positioning the cap laterally relative to the container. As the successive containers continuously move beneath the lower end of the cap chute, each container will withdraw a cap which will be guided into position and leveled into horizontal position relative to the upper end of the container.

As each cap is engaged by a container and pulled from the chute, the rollers 40 are raised thereby relieving pressure on the forward ends of rods 45. This allows the valve 52 to be opened. A charge of live steam will be supplied by nozzle portion 60 into the angular space between the upper end of the container 61 and the cap 24, as shown in Figure 8. This jet of steam impinges upon the inner or lower surface of the cap, and by condensation deposits a film F of moisture upon this relatively cold surface of the interior of the cap, the outer surface of the cap being in contact with air only. As the forward movement of the container and cap withdraws the cap from the chute 22, the rear edge of the cap drops off the edge of the supporting block 33 and down to a relatively level position, as shown in Figure 9. As the top portion of the cap passes the upper wall 60a of the nozzle portion 60, the jet of live steam, issuing from the upper portion of the nozzle, will come into contact with the upper surface of the cap. This will raise the temperature of the upper portion of the cap sufficiently to vaporize the film of water upon its inner surface. This results in an expansion of the vapor beneath the cap and within the head space of the container at the instant of sealing, when the cap seats on the container. Consequently, there will be a more complete displacement of air and a higher vacuum. When the cap reaches horizontal or level position, the rollers 40 will be in their original low position and the extensions 44 will press downwardly on the outer ends of rods 45. This will close valve 52 and will shut off the flow of steam from nozzle portion 60. Instantly with the shutting off of the flow of steam into contact with the cap, the pressure within the head space of the container beneath the cap will drop so rapidly, as a result of the rapid condensation of the steam, that atmospheric pressure will press the cap into sealing position and will be sufficient to hold the cap down on the container with the gasket 66 in sealing contact with the container. The jet of steam admitted directly to the head space of the container beneath the cap results in a high degree of turbulance in the head space and, therefore, a more thorough displacement of the air therefrom.

The drop in pressure will serve to draw the cap down into sealing contact with the upper end of the container and may draw the skirt downwardly so that the gasket will be in partly telescoping relationship to the surface 62, as shown in Figure 9. However, the gasket will always be drawn into firm sealing contact with the upper end of the container by the reduction in pressure in the head space of the container beneath the cap. Thus, the cap is initially sealed on the upper end of the container by the charging of the steam beneath the cap.

In order to guide the containers laterally of the chain conveyer into proper association with the unit 2, I provide diverging guide members 72 which are shown in Figures 2, 3 and 5. These guide members 72 are carried by the vertical supports 28 intermediate the height thereof, as shown in Figure 3, and extend rearwardly therefrom. As each container is moved into association with the unit 2, the members 72 will engage it and position it in alignment with the unit 2.

In order to grip the containers and prevent rearward slipping thereof as each container withdraws a cap from the cap feed, I provide novel container gripping means which functions as the container engages the cap and withdraws it from the chute. It is particularly important to provide this means when small diameter containers are being fed inasmuch as they have a tendency to upset rearwardly when the upper end of the moving container engages the stationarily supported dependent cap. This gripping means is shown best in Figures 1 to 3, inclusive, 6, 10 and 11.

Figure 10:
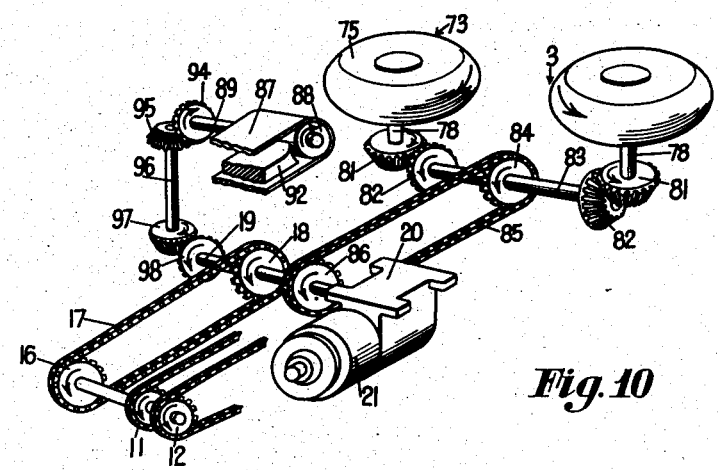
Figure 10 is a schematic view in perspective of the driving mechanism of my machine.

This gripping means comprises a pair of gripping rollers 73. These rollers are disposed at opposite sides of the chain conveyer and adjacent the unit 2. They are disposed horizontally at such a level, spaced above the plate 6, that the containers supported by the conveyer and moved successively therebetween will be properly supported by the rollers. Each of the rollers 73 comprises a wheel 74 (Figure 3) upon which a pneumatic tire 75 is mounted. This tire may be inflated by means of a valve 76. The wheel 74 is provided with a hub 77 which is keyed to the upper end of a shaft 78 (Figures 1 and 10). The shaft passes down through the plate 6 and is rotatably mounted in a bearing 79 thereon. The center portion of the wheel is normally covered by a removable plate 80. Each of the shafts 78 has a bevel pinion 81 keyed on its lower end below the plate 6. The pinions 81 mesh with bevel pinions 82 keyed on the ends of transverse horizontal shaft 83 which is rotatably carried beneath the plate 6. Midway between its ends the shaft 83 has a sprocket 84 keyed thereon. An endless chain 85 passes around the sprocket 84 and around a sprocket 86 keyed on the shaft 19. Thus, the shaft 19 will serve to drive the rollers 73 in opposite directions. These rollers will be driven in such a manner that the peripheral portions thereof will travel in the same direction and at the same linear speed as the conveyer chain.

Figure 11:
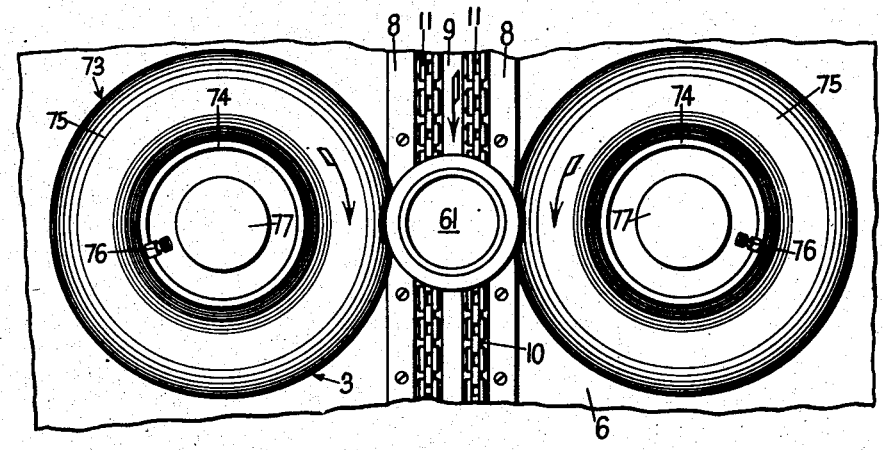
Figure 11 is a plan view of mechanism which may be employed for gripping the container during the sealing operation.

As indicated in Figure 11, as the container 61 is brought between the converging surfaces of the rollers 73, by the continuously moving conveyer, the container is driven firmly but resiliently between the rollers. It will be noted from Figures 2 and 5 that the axes of rollers 73 are substantially in alignment with the lower end of the cap feed. Consequently, the rollers will exert their greatest gripping force on the container as the container is withdrawing the cap from the lower end of the cap feed. This is where the gripping action is needed most. Thus, with this structure, there will be no danger of the container being upset as it withdraws the cap from the cap feed. The amount of the gripping action, that is, the resilient force exerted by the rollers on the container, may be varied by variations in pressure of the air within the pneumatic tires 75. As the container moves along, it will pass a line extending through the axes of these rollers and will therefore reach the diverging portions of the roller and will be released.

After the caps have been applied to the containers in the manner indicated, the containers may be subjected to the mechanical pressure sealing unit 4 or its equivalent. Whether or not they are subjected to this unit 4 will depend upon the type of cap being used to seal the containers. If it is a side seal cap of the type previously described, it will be desirable to use such a mechanical sealing unit as the unit 4. However, the unit 4 need not necessarily be mounted directly adjacent the unit 2, although it is preferred to have it so mounted. The mechanical pressure sealing may occur after a considerable period of time has elapsed subsequent to the initial sealing by the combustible mixture.

The unit 4 is illustrated best in Figures 1, 2 and 10. It comprises an endless belt 87 mounted in substantially the same vertical plane as the chain conveyer. This endless belt is disposed at a proper level to force the cap down into the final sealing position on the containers with the gasket 66 in frictional contact with the vertical surface 62 of the container.

The endless belt 87 is made of suitable flexible material. It is carried by a pair of longitudinally spaced transversely disposed rolls 88. These rolls 88 are keyed on transverse horizontal shafts 89 which are rotatably carried in bearings formed on the upper portion of a vertical support 90 which is disposed along one edge of the chain conveyer and extends longitudinally parallel thereto. This support 90 is bolted to the upper surface of plate 6, as at 91. Between the rolls 88 and above the lower strand of belt 87 is a pressure shoe 92. This shoe is flexibly mounted for vertical movement by means of a spring-pressed plunger structure 93 which is carried by the support 90. The shoe 92 is normally forced downwardly. The roll 88 at the rear is higher than the one at the front. Therefore, as the container moves beneath the belt, the cap will be gradually pressed down into its final position on the container, the shoe 92 serving to produce a resilient pressure thereon.

The belt 87 is driven at the same linear speed and in the same direction as the conveyer. One of the shafts 89 is extended and has a bevel pinion 94 keyed thereon. This pinion 94 meshes with a bevel pinion 95 keyed on the upper end of a vertically disposed shaft 96 which is suitably supported by plate 6 for rotation. The lower end of shaft 96 has a bevel pinion 97 keyed thereon which meshes with a bevel pinion 98 keyed on the outer end of shaft 19. Thus, the belt 87 and the chain conveyer 11 will both be driven by shaft 19 and will be driven at the same linear speed. Consequently, as the chain 11 moves the initially sealed containers beneath the belt 87, the caps will be forced downwardly by the belt into their final positions.

In the operation of my machine, the filled containers are positioned on the chain conveyer, regardless of spacing, and the conveyer will first carry the containers to the unit 2. As they move into association with this unit, they will be gripped by the unit 3. At the unit 2, one of the caps will be engaged by the container and will be withdrawn from the cap chute. The valve 52 will be actuated to supply a charge of live steam in association with the cap being withdrawn. The steam is first charged into the angular space between the cap and container. This jet of steam first impinges upon the inner or lower surface of the cap, and by condensation deposits a film of moisture upon this relatively cold surface of the interior of the cap, the outer surface of the cap being in contact with air only. As the forward movement of the container and cap withdraws the cap from the cap chute, the rear edge of the cap, being no longer supported by the cap chute, drops down to a relatively level position upon the finish of the container. During this brief interval, the jet of live steam comes into contact with the outer or upper surface of the cap and raises its temperature sufficiently to vaporize the film of water upon its inner surface. This results in an expansion of the vapor within the head space at the instant of sealing, resulting in a more complete displacement displacement of air and a higher evacuation. As the cap is seated and the jet of steam is cut off by valve 52, the pressure within the head space will drop so rapidly, as a result of the rapid condensation of the steam, that atmospheric pressure will press the cap on its seat on the container and will be sufficient to initially seal the closure upon the container. The jet of steam admitted directly to the head space of the container beneath the cap results in a high degree of turbulence within the extended head space and a more thorough purging of the air from the sealing zone with a more economical use of steam than could otherwise be attained such as by the methods employing a steam chamber or tunnel.

After this initial sealing action, the container moves into association with the unit 4 which will apply mechanical pressure to effect the final sealing operation. The vacuumizing and sealing operation is performed during the continuous movement of the container through the machine.

Figure 12:
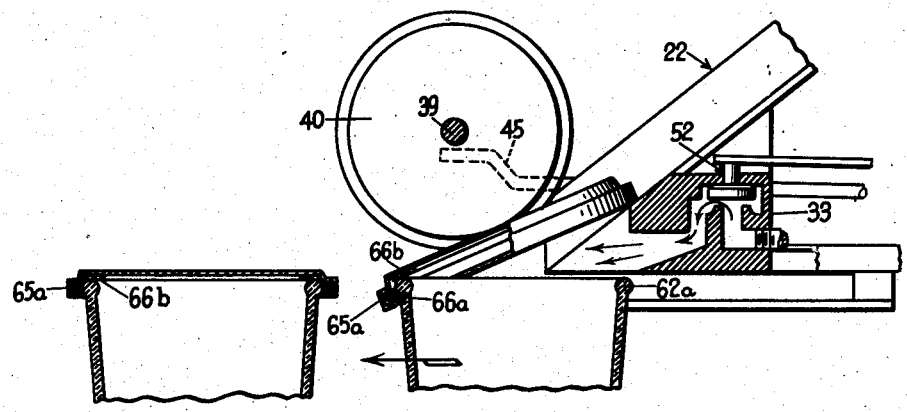
Figure 12 is a view similar to Figure 8 but showing a different type of cap being applied to the container.
Figure 13:
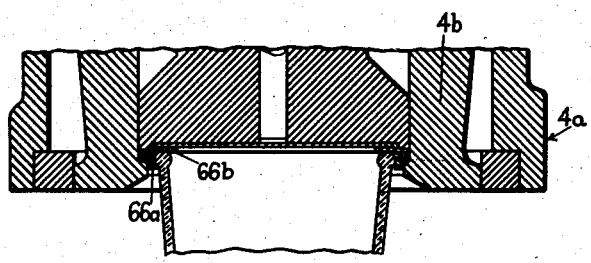
Figure 13 is a view showing how the cap applied in Figure 12 may be crimped in final position.

In Figure 12, I have illustrated my apparatus being used in connection with a different type of cap and container. The cap is provided with a skirt 65a adapted to be deformed around a bead 62a on the container to mechanically anchor the cap in position. The cap is provided with a side seal gasket 66a and with a top seal gasket 66b. The cap is applied to the container by the unit 2 in exactly the same manner as before. The initial seal will be effected by seating the cap on the container with the gasket 66b in contact with the upper end of the container. The vacuum created within the container will be sufficient to hold the cap in position. Then, the container wtih the cap thereon is moved to another sealing unit 4a which consists of a chuck 4b that is adapted to surround the skirt of the cap and to subject the skirt to a bending action, indicated in Figure 13, to cause the gasket 65a to engage the bead 62a and anchor the cap in position. Thus, the seal is initially effected by the unit 2 and the mechanical seal is later effected by the unit 4a. A long period may elapse between these two sealing operations.

Figure 14:
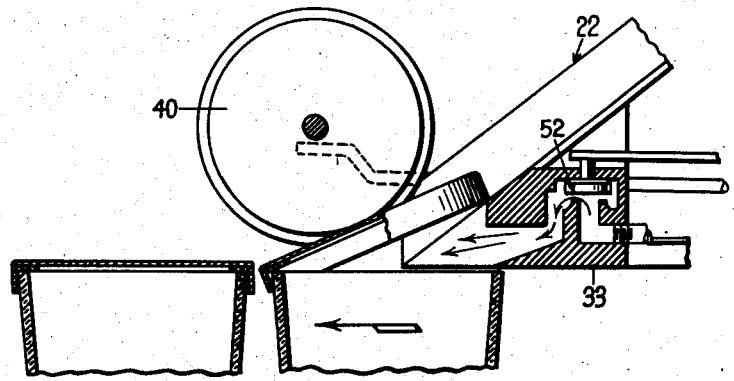
Figure 14 is a view similar to Figure 12 but showing another type of cap being applied to the container.

In Figure 14 I illustrate my apparatus being employed with a cap of the top seal type. This cap is provided with a top seal gasket 65c adapted to seat upon the top edge of the container. The cap is applied by the unit 2 exactly as before. However, with this type of cap, it will not be necessary to use any mechanical sealing unit. The vacuum created within the container by the unit 2 will serve to retain the cap in position.

It will be apparent from the above description that I have provided a sealing machine for applying a cap to a container and for creating a partial vacuum in the upper end of the container wherein the cap is applied to the container in sealing contact therewith by atmospheric pressure. My apparatus and method will continuously apply the caps and seal the containers during their progressive movement.

During sealing of the containers, live steam will be supplied first beneath the caps and then on top of the caps in order to eliminate any moisture from the interior surface of the caps. As soon as the cap is seated, the drop in pressure beneath the cap within the head space of the container is so rapid, as the result of the very rapid condensation of the steam, that atmospheric pressure alone is sufficient to seal the cap upon the container when it is supported in proper relationship to the upper end of the container. The desired vacuum is produced without the use of a steam tunnel or chamber thereby resulting in an economy in steam and also precluding the entrapment of too much moisture beneath the cap. Furthermore, this makes it possible to use much more simple and compact apparatus.

Various other advantages will be apparent from the preceding description, the drawings and the following claims.

Having thus described my invention, what I claim is:

1. Apparatus for sealing caps on containers comprising a conveyer, a cap-feeding unit disposed above the conveyer for supporting caps in position to be engaged and withdrawn by successive containers carried by the conveyer to apply the caps to the containers, means associated with the cap-feeding unit for injecting live steam beneath each cap as it is withdrawn and applied to each successive container, and control means for said last-named means actuated by withdrawal of the cap from said unit.

2. Apparatus for sealing caps on containers comprising a continuously moving conveyer, a cap-feeding unit disposed above the conveyer for supporting caps in position to be engaged and withdrawn by successive containers carried by the conveyer to apply the caps to the containers, means associated with the cap-feeding unit for injecting live steam first beneath each cap and then on the cap as it is withdrawn and applied to each successive container, and control means for said last-named means actuated by withdrawal of the cap from said unit.

3. Apparatus for sealing caps on containers comprising a straight-line continuously moving conveyer, a cap-feeding chute disposed in inclined position above the conveyer for feeding successive caps into position to be engaged and withdrawn by successive containers carried by the conveyer to apply the caps to the containers, means associated with the lower end of the cap-feeding chute for injecting live steam beneath each cap as it is applied to each container, and control means for said last-named means actuated by withdrawal of the cap from the cap chute.

4. Apparatus according to claim 3 wherein the means for injecting steam beneath the cap also acts to supply steam in contact with the top of the cap as the cap approaches horizontal seating position on the container.

5. Apparatus for sealing caps on containers comprising a conveyer, a cap-feeding unit disposed above the conveyer for supporting a cap in position to be engaged and withdrawn by a container carried by the conveyer to apply the cap to the container, a steam jet associated with the cap-feeding unit and directed toward the supported cap for charging steam beneath the cap as it is applied to the container, and control means for said steam jet actuated by withdrawal of the cap from said cap-feeding unit by the container.

6. Apparatus according to claim 5 wherein said steam jet has a nozzle portion of sufficient extent that the top surface of the cap will be subjected to steam as the cap approaches seating position on the container.

7. Apparatus according to claim 5 wherein said conveyer is driven continuously.

8. Apparatus for sealing caps on containers comprising a conveyer, a cap-feeding chute disposed in inclined position above the conveyer, means associated with the lower end of the cap-feeding chute for supporting the cap in inclined position to be engaged and withdrawn by the next container moved into association therewith by the conveyer to apply the cap to the container, means associated with the lower end of the cap chute for charging steam first beneath and then on the outer surface of the lowermost cap as it is applied to the container, and means actuated by withdrawal of the cap from the cap chute for actuating said last-named means.

9. Apparatus according to claim 8 wherein the conveyer is driven continuously.

10. Apparatus according to claim 8 wherein a mechanical sealing member is associated with the conveyer for engaging the capped container after the cap is applied thereto.

11. Apparatus according to claim 8 wherein horizontally disposed guide rails are provided beneath the cap chute for engaging the cap to move it into horizontal position.

12. Apparatus according to claim 8 wherein a pair of rollers are provided at the lower end of the cap chute for engaging the top surface of the cap at diametrically opposed points, said rollers being flexibly mounted for vertical movement.

13. Apparatus according to claim 8 wherein horizontally disposed guide rails are provided beneath the cap chute for engaging the lower surface of the cap to move it into horizontal position, and rollers are provided at the lower end of the cap chute for engaging the top surface of the cap to aid in guiding it to horizontal position.

14. Apparatus according to claim 8 wherein means is provided for gripping each cotainer to prevent tilting thereof as it withdraws a cap from the cap chute.

15. Apparatus for sealing caps on containers comprising a conveyer, an inclined cap chute disposed above the conveyer, means associated with the lower end of the chute for supporting the lowermost cap in tilted position to be engaged by the next container carried by the conveyer, a steam jet associated with the lower end of the cap chute opposite the supported cap for first injecting steam beneath the cap as it is withdrawn from the chute and then onto the cap as it approaches seated position on the container, means for leveling the cap on the container as it is withdrawn by the conveyer, said means comprising a pair of guide rails disposed below the cap chute and projecting forwardly thereof, said guide rails being spaced apart at such a distance that they will engage the lower edge of the cap.

16. Apparatus according to claim 15 wherein the supply of steam to the steam jet is controlled by means actuated by withdrawal of the cap from the cap chute.

17. Apparatus according to claim 15 wherein said guide rails are mounted for limited lateral and vertical movement.

18. Apparatus according to claim 15 wherein a roller is provided at the lower end of the cap chute for engaging the upper surface of the lowermost cap in the chute.

19. Apparatus according to claim 15 wherein a pair of rollers are supported at the lower end of the cap chute for engaging the top surface of the lowermost cap at diametrically opposed points as it is withdrawn from the cap chute, said rollers having flanges extending over the side edges of the cap.

20. Apparatus according to claim 15 wherein a pair of rollers are provided at the lower end of the cap chute for engaging the top surface of the lowermost cap at diametrically opposed points as it is withdrawn from the cap chute, said rollers having flanges extending over the side edges of the cap, said rollers being mounted for limited lateral movement and limited vertical movement.

21. Apparatus for sealing caps on containers comprising means for progressively moving the containers, means for supplying caps to successive containers during their progressive movement, and means for supplying steam beneath the cap and in the head space of each container during its progressive movement, said last-named means being controlled by said cap-supplying means.

22. Apparatus for sealing caps on containers comprising a conveyer, a cap-feeding chute disposed in inclined position above the conveyer, means associated with the lower end of the cap-feeding chute for supporting the cap in inclined position to be engaged and withdrawn by the next container moved into association therewith by the conveyer to apply the cap to the container, means associated with the lower end of the cap chute for charging steam beneath the lowermost cap as it is applied to the container, a valve for controlling the supply of steam to said last-named means, and means actuated by withdrawal of the cap from the cap chute for actuating said valve.

23. Apparatus according to claim 22 wherein a pair of rollers are provided at the lower end of the cap chute for engaging the top surface of the cap at diametrically opposed points, means for flexibly mounting said rollers for vertical movement, and connecting means for operatively connecting said flexibly mounting means to said valve.

24. Apparatus according to claim 22 wherein a pair of rollers are provided at the lower end of the cap chute for engaging the top surface of the cap at diametrically opposed points, means for flexibly mounting said rollers for vertical movement, said mounting engaging a pair of rods extending forwardly from the cap chute at each side thereof and normally holding the rods downwardly, said rods having their rear ends connected to a rotatable shaft, an arm carried by said shaft, said arm operating said valve and normally holding said valve in closed position.

WILLIAM D. BELL.